United States Patent [19]

Adams

[11] Patent Number: 5,787,366
[45] Date of Patent: Jul. 28, 1998

[54] COMMUNICATION INTERFACE BETWEEN A COMPUTER AND A VEHICLE DEVICE

[75] Inventor: Jürgen Adams, Villingen-Schwenningen, Germany

[73] Assignee: VDO Adolf Schindling AG, Frankfurt, Germany

[21] Appl. No.: 628,940

[22] Filed: Apr. 8, 1996

[30] Foreign Application Priority Data

Apr. 6, 1995 [DE] Germany .................. 195 12 903.2

[51] Int. Cl.⁶ .................. G08C 17/06; G06K 7/08
[52] U.S. Cl. .................. 701/1; 701/29; 701/35; 395/882; 395/892; 361/763; 361/766; 341/33
[58] Field of Search .................. 384/428.098, 424.034, 384/424.04; 341/22, 50, 33, 34; 361/681, 683, 686, 763, 766; 395/882, 883, 884, 892; 345/173, 174

[56] References Cited

U.S. PATENT DOCUMENTS

| | | | |
|---|---|---|---|
| 5,278,759 | 1/1994 | Berra et al. | 365/195 |
| 5,491,418 | 2/1996 | Alfaro et al. | 307/9.1 |

*Primary Examiner*—Tan Q. Nguyen
*Attorney, Agent, or Firm*—Martin A. Farber

[57] ABSTRACT

A communication interface between a computer and a vehicle device employs at least one large-area function element of the vehicle device which is developed as counter-electrode for an electrode of a capacitive coupling adapter. The adapter is connected to a computer, and can be applied from the outside to the vehicle device.

17 Claims, 2 Drawing Sheets

COMMUNICATION INTERFACE BETWEEN A COMPUTER AND A VEHICLE DEVICE

FIELD AND BACKGROUND OF THE INVENTION

The present invention relates to a communication interface between a computer and a vehicle device. Various developments of communication interfaces between a computer and a vehicle device are known, for instance galvanic couplings by means of a plug connection, optical couplings via an infrared data transmission path, or inductive couplings via transformer coil arrangements. All of these elements require additional means in the vehicle device which results in an expense and makes additional installation space necessary.

SUMMARY OF THE INVENTION

The object of the present invention is to simplify a communication interface of this type between a computer and a vehicle device and thus reduce its cost.

BRIEF DESCRIPTION OF THE DRAWINGS

With the above and other objects and other advantages in view, the present invention will become more clearly understood in connection with the detailed description of preferred embodiments, when considered with the accompanying drawings of which.

DETAILED DESCRIPTION OF THE PREFERRED EMBODIMENTS

The invention will be described below in connection with using a taximeter as example of a vehicle device. In this use, rate data for instance is to be transmitted from a computer to the taximeter or shift data is to be transmitted from a taximeter to a computer which is not part of the vehicle.

Figure 1:
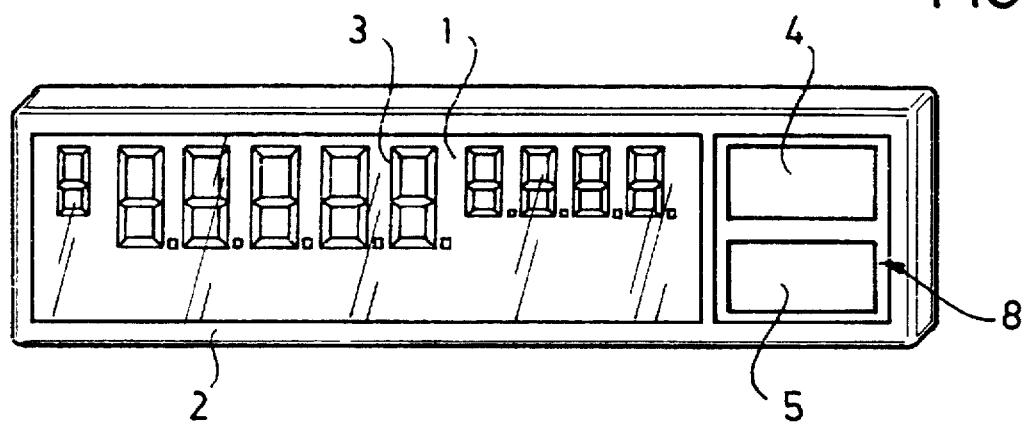
FIG. 1 is a perspective view of a taximeter employing a communication interface of the invention.

As can be noted from FIG. 1, a modern electronic taximeter has an electronics support 1 which is mounted in a support frame 2 which forms the housing of the device and has, on its front side, at least display means 3 and operating elements 4 and 5, the latter being preferably developed as touch-sensitive keys. The display means 3 are covered by a transparent front glass, at least in their active region of display.

Figure 1A:
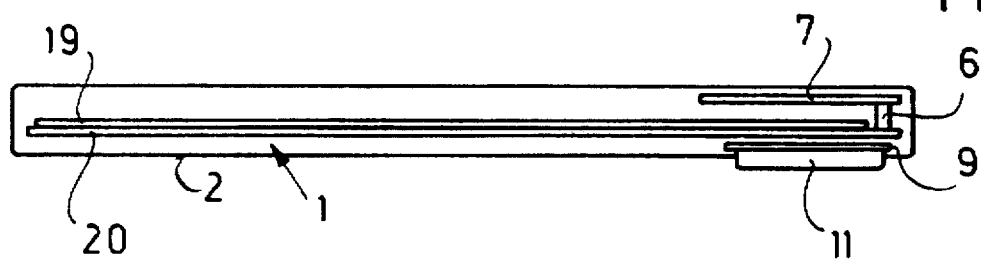
FIG. 1A is a sectional view showing the communication interface.

FIG. 1A is a longitudinal section through the support frame 2 in top view. Spaced by a conductive connector 6 from the electronics support 1 there is present in the support frame 2, behind the key arrangement formed by the operating elements 4 and 5, a support 7 for an auxiliary circuit (not shown in detail) which may also contain the power pack of the device as well as the connection wiring for a position pickup.

Figure 1B:
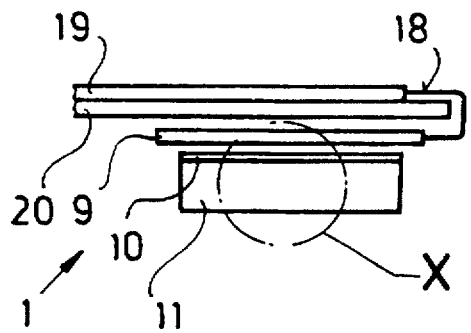
FIG. 1B is a detailed view of the communication interface.

The enlarged detail of FIG. 1B shows the construction of the operating elements 4 and 5. On the circuit board 20 of the electronics support 1 there is present, on the side facing the front of the device, within the keypad 8 a touch-sensitive keyboard 9 having an electric connection 18 with the electronics 19 of the support 1. The electrode 10 of the coupling adapter 11 can be placed from the outside on this keypad, or on at least one key of the keyboard.

Figure 1C:
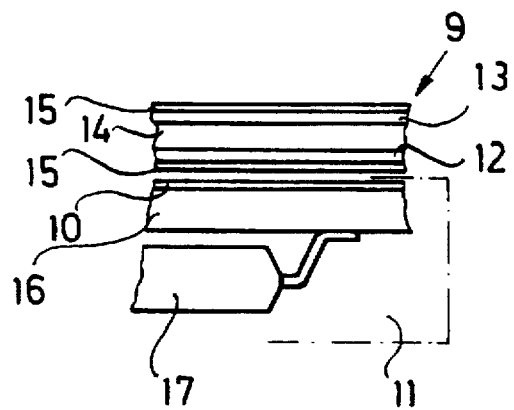
FIG. 1C is a detailed view of an electrode assembly, identified as X in FIG. 1B.

In the case of a touch-sensitive keyboard, as the further enlarged detail X from FIG. 1B shows, in FIG. 1C a cover electrode 12 is pressed by manual actuation on a rear electrode 13 arranged fixed in position in the device, as a result of which a short circuit is produced which is converted into an electric signal by a resistance wiring, not shown in detail here, and can be evaluated as such by a microprocessor 43 (FIG. 2) which is arranged on the electronic support 1. Cover electrode 12 and rear electrode 13 are spaced apart by a space 14 formed as air cushion which insulates the two electrodes from each other in the unactuated condition of the keyboard. Both electrodes are covered by a touch-sensitive material 15 which protects them from the outside. The cover electrode 12 forms the front electrode on the device side.

The electrode of the coupling adapter 11 can be arranged in such a manner on the front of the vehicle device that a capacitive linkage to at least one electrode of a functional element of the vehicle device is produced. As a rule, however, the cover electrode and the rear electrode 13 together form the coupling element in the vehicle device for the production of the capacitive transfer path, when the electrode 10 of a coupling adaptor 11 is applied to the vehicle device from the outside. The support frame 2 and the housing of the coupling adaptor 11 are advantageously so developed that the electrode 10 of the coupling adaptor 11 is guided parallel to the coupling element of the vehicle device. Furthermore, the coupling adapter 11 is so constructed that it can contain the electronics necessary for the data transfer, said electronics consisting, for instance, of an integrated circuit 17 arranged on a circuit board 16.

Figure 2:
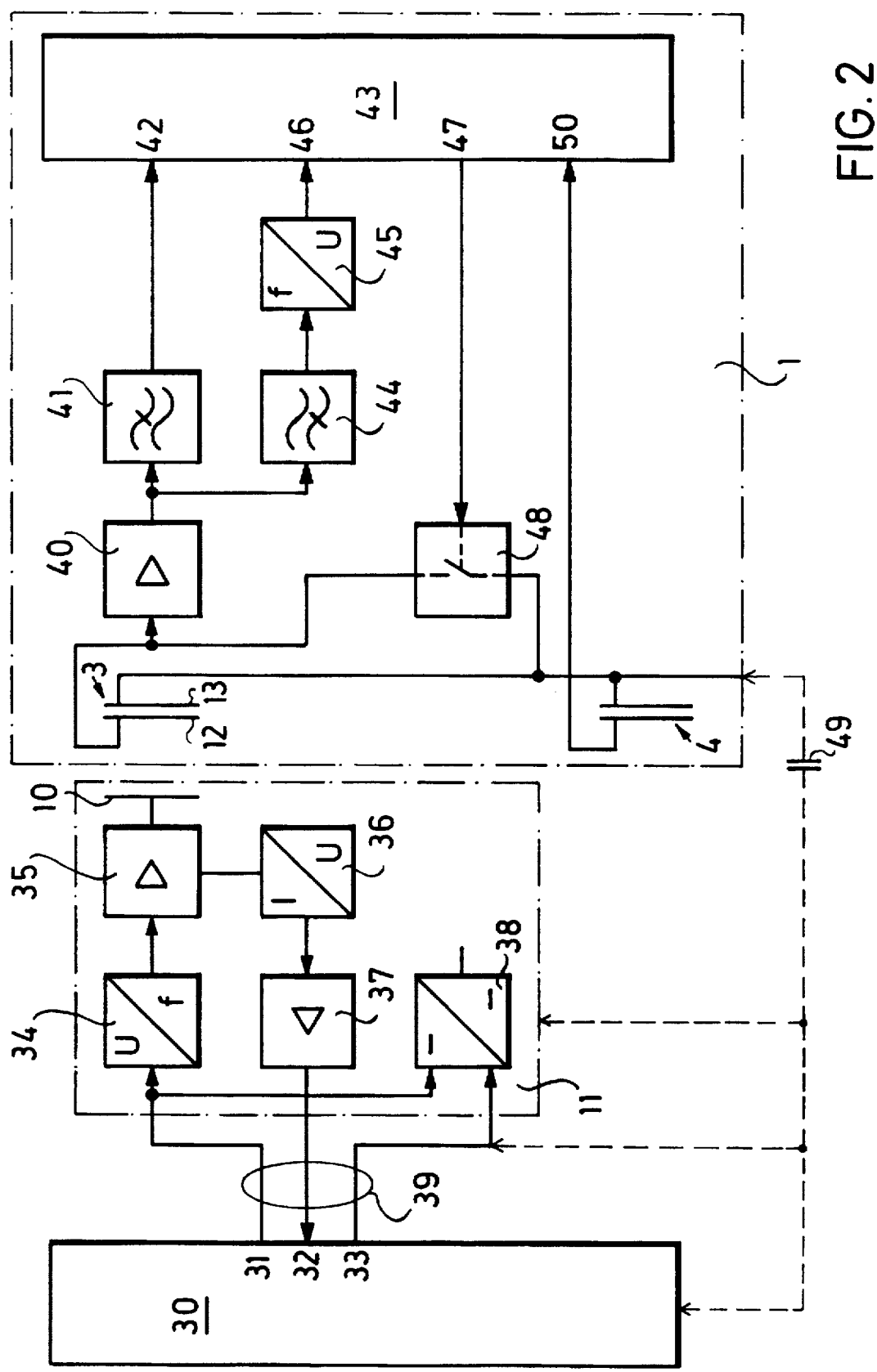
FIG. 2 is a schematic and block diagram of the communication interface.

FIG. 2 shows the manner of operation of the interface. The coupling adapter 11 is connected in electrically conductive manner to a preferably portable computer 30, for instance a laptop. The data transfer between the computer 30 and the coupling adapter 11 is effected via a serial interface 39 of the computer 30, which on the computer side has a data output 31, a data input 32 and a ground line 33 as reference potential. The data to be transferred are transmitted in the form of sequences of pulses, i.e. in the form of a bit stream. The coupling adapter 11 itself contains as functional units: (1) for the transmission of data to the vehicle device a carrier oscillator 34 and a signal amplifier 35, (2) for the reception of data from the vehicle device a current-to-voltage converter 36 and a signal amplifier 37 and, (3) for both types of operation, at least one electrode 10 as coupling element of physical interface with the vehicle device. The power supply for the electronic operating units of the coupling adapter 11 is provided in advantageous fashion via a d.c. converter 38 which receives the required electric power from the data output 31 with reference to the ground line 33 of the serial interface 39 of the computer 30. The carrier oscillator 34 is modulated as a function of the bit presentation at the data output 31 of the computer 30. Although here, for instance, the development of the invention is shown for use of the half-duplex process for the data transmission, it is not limited to this.

The electrode 10 of the coupling adapter 11 is brought, for the transfer of a stream of data from or to a vehicle device in capacitative linkage with the cover electrode 12 of the touch-sensitive keyboard of the vehicle device. For this purpose, the coupling adapter 11 is either held by an operator with his hand close in front of the key surface of the vehicle device, or holding devices suitable for receiving the adaptor are developed on the vehicle device. After the starting of a program in the computer 30, the exchange of data between the computer 30 and the vehicle device can take place. Such data may be transmitted by a half-duplex process. If necessary, different messages can be given to the display of the vehicle device or to a display of the computer 30. In particular, error messages as a result of defective signal coupling can be displayed in this way if, for instance, the adapter is prematurely removed from its operating position on the vehicle device.

The cover electrode 12 of the touch-sensitive keyboard is connected to an input circuit 40 which has a high-ohmic signal input and can be developed as a transistor amplifier. This input circuit 40 is able to receive and amplify both a static signal, such as a short circuit between the cover electrode 12 and the rear electrode 13, and an alternatingcurrent signal which is capacitively introduced by the coupling adapter. If the key surface of the operating element is actuated manually, the electrodes 12 and 13 are short circuited and the input circuit 40 sends, via a low-pass filter 41, a signal to the corresponding input 42 of the microprocessor 43 for the evaluation of the key signal. If, on the other hand, a carrier signal is introduced capacitively from the coupling adaptor 11 into the cover electrode 12 of the touch-sensitive keyboard, this signal passes from the input circuit 40 via a high-pass filter 44 to a frequency discriminator 45 which, after a corresponding frequency selection, produces a pulse-like logical signal or a sequence of signals of 0 and 1 bits and delivers same to the data input 46 of the microprocessor 43. The frequency of the carrier signal should be made higher than the frequency of the data bits to be transmitted. It has been found advantageous to select a carrier signal frequency of more than 200 kHz.

In the case of the disconnecting of data or of a stream of data formed by a sequence of bits from the vehicle device to the coupling adapter 11, and this finally to the computer 30, the electrodes 12 and 13 of the touch-sensitive keyboard are short-circuited with low resistance by the switch device 48 in synchronism with the data bits given off by the microprocessor 43 via its data output 47. In this way, the carrier signal which is induced in the cover electrode 12 by the coupling adapter 11, and which now is present in reading operation without modulation by data bits to be transferred on the coupling-adapter side, is absorbed as a function of a low impedance. This low impendance is formed and established by the capacitance of the signal transmission path between the electrodes 10 and 12 and the internal resistance of the switch device 23. This occurs if logical 1-bits are given off by the microprocessor 43 at its data output. As a result, the sequence of bits to be transmitted can be detected in the coupling adapter 11 by determination of the changes in power requirement of the signal amplifier 35 via a current-to voltage transformer 36. The sequence of bits can then be fed via a signal amplifier 37 to the computer 30. The short circuit of the electrodes 12 and 13 on the device side then takes power from the electric field fed by the electrode 10 of the coupling adapter 11. Since the operating voltage of the signal amplifier 35 is constant, it reacts upon the giving off of power to the capacitive transmission path between coupling adapter 11 and vehicle device with an increased current requirement. The increased current is detected by the current-to-voltage transformer 36 and can be used for the production of the data signal.

In order to permit a displacement current to flow in the electrodes 12 and 13 of the keyboard or the electrode 10 of the coupling adapter 11, it is necessary to close the circuit between vehicle device and coupling adapter. For this purpose, the virtual capacitance 49 formed by the body of the operator himself with respect to the environment can be used. This effect is obtained by a ground connecting both of the coupling adapter 11 and the computer 30, as well as of the vehicle device with the vehicle. The body of the operator is sufficiently conductive in order, upon galvanic contact with the coupling adapter 11 or with the computer 30, to form within the vehicle, depending on the location, a capacitance of between 100 pF and several nF.

By way of comparison, the coupling capacitance C to the switch surfaces of the keys amounts in accordance with the relationship $C=\epsilon_o\epsilon_r A/d$ to about 10 pF to 50 pF. Wherein, A is the area active for the coupling and d the distance apart of the electrodes being coupled, $\epsilon_o$ is the electrical field constant and $\epsilon_r$ is the dielectric coefficient, determined by the materials involved, of the dielectric present between the electrodes. It has been found empirically that the amount of the area A is about 80% of the arithmetic mean of the areas of the coupling electrode 10 of the coupling adapter 11 and of the key surfaces participating in the coupling.

As further possibility for the return of the signal, a further actually developed coupling electrode 10 can be provided in the coupling adapter 11, which electrode is applied to a further key surface of the vehicle device so that the coupling capacitance of this second key surface permits the displacement currents through the coupling capacitance of the first key surface.

Optimally, at least one electrode of the coupling element formed from the touch-sensitive keyboard can be acted on continuously on the vehicle device side by an alternating voltage in order to display the state of operation of the taximeter. The taximeter, upon the application of a coupling adapter is immediately evaluated by its electronics and can be fed to a computer for interpretation. This development of the invention leads to a structural simplification of the coupling adapter 11, which may be of interest for purposes of servicing. Furthermore, several keys of the vehicle device can be so wired that, on the one hand, upon the actuation of one of these keys, a switch signal is fed individually to the evaluating microprocessor 43, but that, on the other hand, upon the coupling of data, a coupling carrier signal is taken off in parallel from all keys in order to improve the coupling quality. The improvement of the coupling quality occurs by an enlarging of the coupling surface. The carrier signal is fed over the signal path described above, i.e. over the function groups 40, 44 and 45, to the microprocessor 43.

In FIG. 2, the key 4 is shown as pure switch element without functional effect for a data coupling, the switch signal being fed to an input 50 of the evaluating microprocessor 43. Furthermore, the communication between the microprocessor 43 and the computer 30 can, with suitable programming, be commenced not only on the coupler side, as described above, but also on the vehicle side after the coupling adapter 11 has been placed on the vehicle device.

As a modification of the above embodiment, display means 3 developed as LCD (liquid crystal display) can also be used for the data coupling. Such display means, due to their construction, also have a large-area electrode structure which is developed, for instance, by the segment electrodes. This electrode structure can be made useful, by suitable switching measures as counter-electrode for the electrode 10 of the coupling adapter 11. Driver circuits for the operation of LCD displays are in general of very high resistance. Therefore, a carrier signal which is coupled capacitively by a coupling adapter 11 into the electrode structure of the LCD can, as in the case of the abovedescribed key application, be fed to an evaluation circuit in accordance with the invention which is provided in the vehicle device. If the display of the LCD must remain visible during the transmission of the data, the electrode 10 of the coupling adapter 11 should be transparent or at least partially transparent, for instance in the form a metal grid. In this way also, an inexpensive solution can be realized for a communication interface between a computer which is not part of the vehicle and a vehicle device by multiple utilization of means already present in or on the vehicle device.

I claim:

1. A communication interface between a computer and a vehicle device, comprising:

a computer and a capacitor coupling adapter, said adapter having an electrode and being connected to said computer;

wherein the vehicle device has at least one large-area functional element serving as counter-electrode for said electrode of said adapter to enable said adapter to be applied to the vehicle device from outside the vehicle device.

2. A communication interface according to claim 1, wherein said large-area functional element is an operating unit of the vehicle device, said operating unit being a touch key or a display.

3. A communication interface according to claim 2, wherein said operating unit of the vehicle device is a touch-sensitive keyboard.

4. A communication interface according to claim 2, wherein said display of the vehicle device is an LCD display.

5. A communication interface according to claim 1, wherein said electrode of said adapter is transparent or semitransparent.

6. A communication interface according to claim 1, wherein said electrode and said counter-electrode enable transmission of data by half-duplex process.

7. A communication interface according to claim 1, wherein said adapter comprises:

a carrier oscillator and a signal amplifier coupled thereto as functional units for the transmission of data to the vehicle device;

a current-voltage transformer and a signal amplifier coupled thereto as functional units for the reception of data from the vehicle device; and a coupling electrode, wherein for both transmission and reception of data, said coupling electrode provides an interface to the vehicle device.

8. A communication interface according to claim 7, wherein said adapter further comprises a d.c. converter, and said computer has a serial interface connected to said converter; and said functional units of said adapter are supplied with current via said d.c. converter from the serial interface of the computer.

9. A communication interface according to claim 1, wherein the vehicle device has an input circuit which is provided with a high ohmic signal input and is electrically connected via said counter-electrode to said adapter, said input circuit being able to receive and amplify both an alternating voltage signal introduced capacitively by said adapter.

10. A communication interface according to claim 9, wherein the vehicle device has a coupling element including said counter-electrode, said coupling element of the vehicle device being developed as switchable operating element for receiving a switch signal.

11. A communication interface according to claim 10, wherein said functional element of the vehicle device is a touch sensitive keyboard;

said vehicle device further comprises a low pass filter, a high-pass filer, a microprocessor, and a frequency discriminator;

said input circuit, upon manual actuation of a key surface of said functional element, gives off a signal via said low-pass filter to said microprocessor;

said input circuit, upon a capacitive introduction of an alternating voltage signal by said adapter, conducts a signal over said high-pass filter to said frequency discriminator; and said discriminator, after a frequency selection, outputs a logic signal to the microprocessor.

12. A communication interface according to claim 11, wherein the vehicle device further comprises a switch device operative in synchronism with data bits outputted by said microprocessor;

upon a removal of data from the vehicle device to said adapter, said coupling element in the vehicle device is short-circuited with low resistance by said switch device resulting in an extraction of energy from an electric field built up by said adapter in conjunction with said counterelectrode of the vehicle device; and said extraction of energy is detected in said coupling adapter which produces a signal proportional to the data to be transmitted for forwarding to the computer.

13. A communication interface according to claim 10, wherein at least one electrode of said coupling element in the vehicle device is continuously acted on, on a side of the vehicle device, by an alternating voltage as carrier signal for data transmission.

14. A communication interface according to claim 10, wherein communication between said microcomputer and said computer can be commenced at the vehicle device under program control after application of said adapter to the vehicle device.

15. A communication interface according to claim 1, wherein a circuit between the vehicle and said adapter is closed by a virtual capacitance which is formed by the body of a person operating said adapter with respect to the environment upon galvanic contact by the person with said adapter or with said computer.

16. A communication interface according to claim 1, wherein said adapter comprises a further coupling electrode;

the vehicle device comprises a further counter-electrode; and a circuit between the vehicle device and said adapter is closed by said further coupling electrode in said adapter, which electrode is operative with said further counterelectrode provided in the vehicle device for transmission of a signal between the vehicle device and said adapter.

17. A communication interface according to claim 1, wherein the vehicle device comprises a further set of several large-area functional elements which are provided with electrodes and are connected in parallel in order to increase a coupling electrode surface active upon a transmission of data between the vehicle device and said adapter.

* * * * *